United States Patent

Hesse

[11] Patent Number: 5,944,926
[45] Date of Patent: Aug. 31, 1999

[54] METHOD FOR MANUFACTURING A TIRE CARCASS TO PREVENT SIDEWALL CONSTRICTION

[75] Inventor: Heiko Hesse, Wedemark, Germany

[73] Assignee: Continental Aktiengesellschaft, Hannover, Germany

[21] Appl. No.: 08/900,409

[22] Filed: Jul. 25, 1997

[30] Foreign Application Priority Data

Jul. 27, 1996 [DE] Germany .................. 196 30 452

[51] Int. Cl.⁶ .................................................. B29D 30/44
[52] U.S. Cl. .................. 156/132; 152/548; 156/133; 156/134; 156/229
[58] Field of Search ................................ 156/133, 134, 156/130.5, 229, 220, 322, 132; 152/548

[56] References Cited

U.S. PATENT DOCUMENTS

| 4,261,393 | 4/1981 | Saito et al. ........................ 152/548 |
| 5,200,009 | 4/1993 | Tokita . |
| 5,437,751 | 8/1995 | Hirano et al. . |
| 5,616,198 | 4/1997 | Suzuki et al. ........................ 152/548 |

FOREIGN PATENT DOCUMENTS

| 0239160 | 9/1987 | European Pat. Off. . |
| 56-99804 | 8/1981 | Japan .................. 152/548 |
| 58-101805 | 6/1983 | Japan .................. 152/548 |
| 60-60006 | 4/1985 | Japan .................. 152/548 |
| 754019 | 8/1956 | United Kingdom .................. 152/548 |

*Primary Examiner*—Geoffrey L. Knable
*Attorney, Agent, or Firm*—Robert W. Becker & Associates

[57] ABSTRACT

A method for manufacturing a tire carcass includes the step of providing a liner of an air-impermeable material. A carcass ply material is prepared by heating and stretching plastic cords and embedding the stretched plastic cords in rubber. A ply of the carcass ply material is placed onto the liner with overlapping leading and trailing ply ends. The overlapping ply ends are heated for returning the stretched plastic cords into an unstretched state. Bead cores are then positioned onto the ply. The lateral edges of the ply are folded over the bead cores. The folded lateral edges and the bead cores are then enveloped by lateral strips.

13 Claims, 3 Drawing Sheets

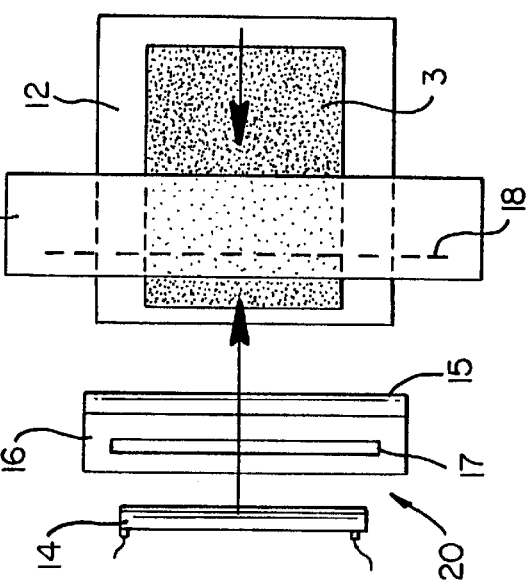
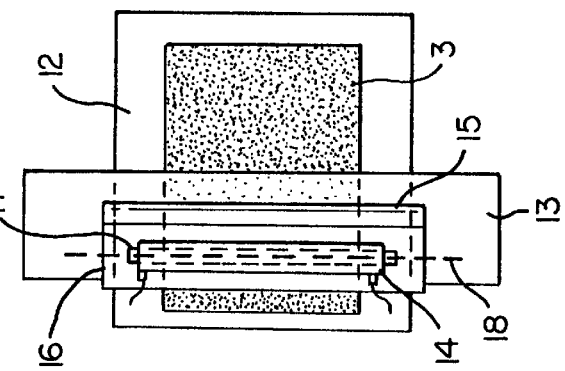
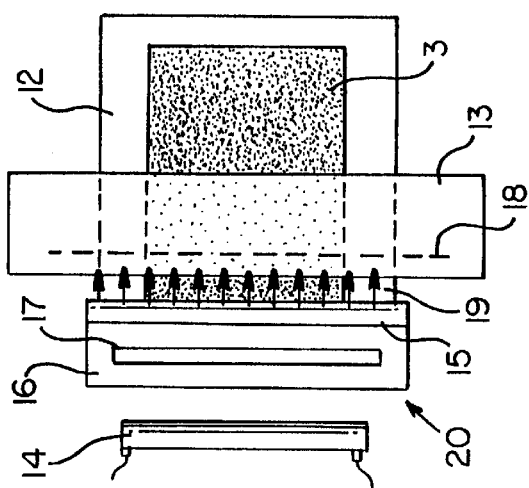
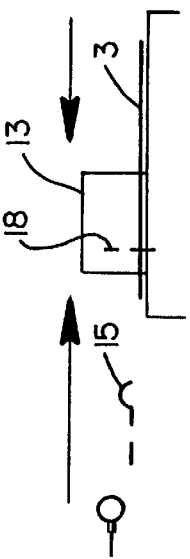
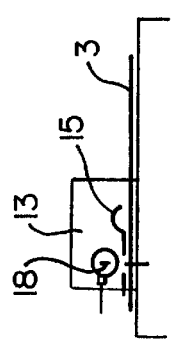
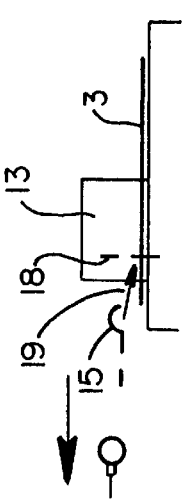

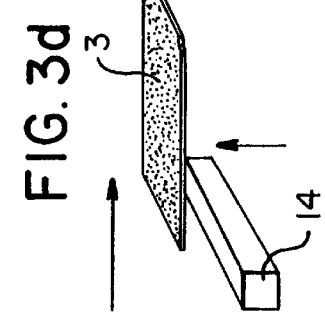
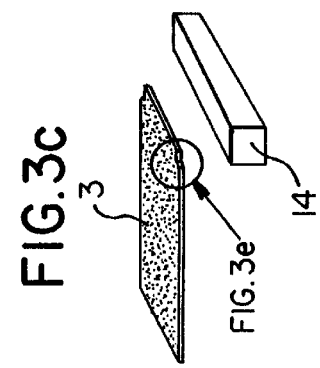
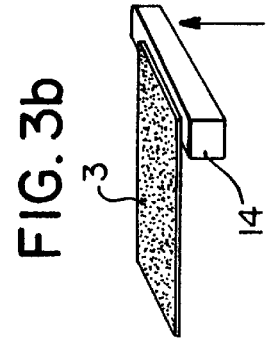
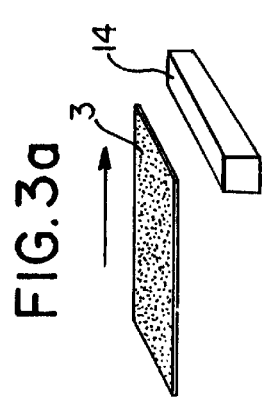
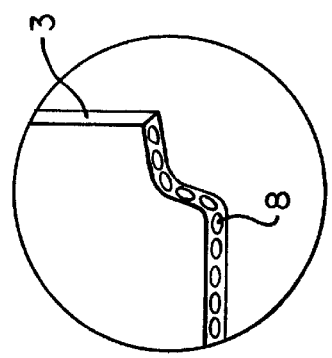

METHOD FOR MANUFACTURING A TIRE CARCASS TO PREVENT SIDEWALL CONSTRICTION

BACKGROUND OF THE INVENTION

The present invention relates to a method for manufacturing a tire carcass comprised of multiple plies, especially for a vehicle tire, by winding plies onto a winding drum with the following steps:

a) Providing a liner made of an air-impermeable rubber ply;

b) Applying a ply onto the liner, whereby the ply material is comprised of plastic cords embodied in rubber material which plastic cords, before embedding, have been stretched under heating, whereby the beginning and the end of the applied ply overlap;

c) Positioning the bead cores;

d) Folding the lateral edges of the ply onto the bead cores; and e) Applying lateral strips etc. and enveloping the bead cores.

Onto a thus created carcass the belt and the tread strip of the tire are applied subsequently by winding onto the tire building drum. Then, the green tire is vulcanized.

The individual plies are respective strips that are cut to length to be individually placed onto the tire building drum whereby the ends of each ply, in general, are overlaped in order to ensure that a closed strip in the circumferencial direction will result. The ply is comprised of a rubber layer which, in the direction of its width (transverse direction), includes reinforcing members in the form of cords. These cords may consist, for example, of rayon, polyester, or any other suitable plastic material. Polyester cords have the advantage, in comparison to rayon cords, that they are much less expensive. However, it is disadvantageous that they have a higher stretching capability. When the wound carcass is shaped, tensile forces act on the plies, respectively, its cords. Also, during vulcanization of the tire, tensile forces act on the cords so that they are being stretched. In order to ensure a uniform, defined stretching of the cords, they are stretched before being sent to a calender in order to be embedded in the rubber material whereby heat is applied for the stretching process. The amount of stretching of the stretched cords can be canceled by heating. Thus, upon heating the carcass ply material, a shrinkage of the ply may result. During vulcanization of the green tire in the heating press the reinforcement cords thus have the tendency to contract. This is prevented by the inner pressure provided by the bellows. After completion of vulcanization (without pressure within the bellows) an increased tensile stress results in the reinforcement cords which can be frozen (fixed) within the vulcanized rubber.

As a result of the aforedescribed tire building process the plies at the seam have an overlap of approximately 2 to 6 mm. Thus, the ply in this area has twice the material thickness, twice the density of cords (reinforcement members), and thus a different modulus of elasticity. At this location of the ply, a reduced stretching of the ply material thus takes place when tension forces are supplied. When a finished tire is inflated, the seam of the ply is thus visible as a constriction within the sidewall area. The quality and stability of the tire is not affected by this, but the visual appearance is impaired which, in general, is interpreted especially by laymen as a rupture within the carcass so that the tire is returned to the tire manufacturer or to the vehicle dealership.

It is therefore an object of the present invention to provide a method for manufacturing a carcass such that a constricted portion within the tire sidewall can be reliably prevented.

SUMMARY OF THE INVENTION

The method for manufacturing a tire carcass according to present invention is primarily characterized by the following steps:

providing a liner consisting of an air-impermeable material;

preparing a carcass ply material by heating and stretching plastic cords and embedding the stretched plastic cords in rubber;

placing a ply of the carcass ply material onto the liner with leading and trailing ply ends overlapping;

heating the overlapping ply ends for returning stretched plastic cords into an unstretched state;

positioning bead cores onto the ply;

folding lateral edges of the ply over the bead cores;

enveloping the folded lateral edges and the bead cores by lateral strips.

Advantageously, the step of heating is performed before placing the overlapping ply ends onto the liner.

In the step of heating, the entire width of the ply is heated.

Advantageously, in the step of heating the overlapping ply ends are heated in an area of two to six plastic cords positioned respectively directly adjacent to the leading edge and the trailing edge of the overlapping ply ends.

In the step of heating, the overlapping ply ends are preferably heated in an area of four plastic cords positioned respectively directly adjacent to the leading edge and the trailing edge of the overlapping ply ends.

Expediently, the step of placing includes supplying the carcass ply material as an endless ply material, heating the endless ply material at a cutting location where a cut is to be performed for cutting the endless ply material to length, whereby on both sides of the cutting location the same number of plastic cords is heated.

The step of heating preferably includes selecting a heating period.

After heating, the endless ply material is cooled.

The endless ply material is cut to length after the step of cooling.

The present invention also relates to a device for cutting endless carcass ply material to length, wherein the device is preferably characterized by:

a cutter including a cutting blade for cutting to length endless carcass ply material;

a heat source positioned below the cutter and moveable upwardly into the vicinity of the endless carcass ply material;

the heat source extending over at least a portion of the width of the endless carcass ply material and arranged for heating defined, identical zones of the endless carcass ply material located relative to a longitudinal extension of the cutting blade on both sides of the cutting blade.

Preferably, the heat source extends over the entire width of the endless carcass ply material.

The device may further comprise a sheet metal member having a slot and positioned between the endless carcass ply material and the heat source. The heat source is preferably an infrared heater. The slot has a length matching at least the width of the endless carcass ply material, and the width of the slot is identical to the length of the defined, identical zones to be heated.

Preferably, the device further comprises a cooling device extending over at least a portion of the width of the endless carcass ply material and having spaced-apart air vents positioned parallel to one another and directed onto the endless carcass ply material.

The cooling device preferably extends over the entire width of the endless carcass ply material.

According to the present invention, the carcass ply material is heated in the area of the leading and trailing ends in the area of future overlap in order to cancel the stretching of the stretched cords within the overlap portion.

This method step takes advantage of the fact that the stretching of the stretched cords can be canceled by heating. The carcass ply material is thus reduced in size in the area of the seam and an increased stretching capability is provided. In the inflated tire the cords of the carcass ply material in the overlap area can thus stretch more so that at this location within the sidewall no constriction will occur. The temperature and the required period for heating are dependent on the type of plastic cords used in regard to their composition and dimensions. These parameters are thus to be determined empirically.

The heating of the carcass ply material can be performed on the building drum, but preferably it is performed before applying the ply so that the area of future overlap is heated. The heating action can be carried out over a portion of the width of the carcass ply material or over the complete width of the carcass ply material.

Advantageously, when the carcass ply material is heated in the area of two to six cords directly adjacent to the leading and trailing edge, especially four cords, an improved result will be observed. Thus, the cancellation of the stretching of the cords is performed over a sufficiently long (relative to the circumferencial direction) area in order to provide for a safe overlap of the carcass ply material.

When in the inventive method the individual plies are supplied as endless strip material i.e., strip material of indefinite length, to the tire building drum via a transporting device and cut to the desired length directly before applying onto the building drum, it is especially advantageous when the carcass ply material before cutting is heated directly in the area of the future cut such that on either side of the cutting location the same number of cords is heated. Accordingly, the trailing end of the presently processed ply strip and the beginning of the following ply strip are thermally treated. At the same time, it is ensured that the leading end and the trailing end are treated over the same length so that the future seam overlap will be comprised completely of contracted fibers with increased stretching capability.

Preferably, the carcass ply material after heating is again cooled in order to avoid stretching of the ply before folding of the lateral edges. It is especially advantageous when the cooling takes place before the cutting step. It is possible to use cold compressed air for cooling.

During heating and vulcanization the following effect can be observed according to the inventive method.

All of the cords of the ply which are not in the area of seam overlap have, due to the high heating temperature, the tendency to contract. An increased tensile stress results within these cords. The already contracted cords in the seam overlap, on the other hand, are in a relaxed or un-stressed state. After vulcanization (when no bellows pressure is present) a reduced tensile stress is observed within the now relaxed cords as compared to the remaining cords. This reduced tensile stress is thus "frozen" within the vulcanized rubber, i.e., fixed therein, as is the increased tensional state of the remaining cords outside of the seam area. As mentioned before, this effect has the result that the cords within the seam overlap in the inflated tire can stretch to a greater extent than the remaining cords outside the seam area. Thus, a constriction within the sidewall area is prevented. Since, however, in the seam area twice the density of cords is present, a bulge at this location of the tire is, of course, prevented.

The inventive device for heating the carcass ply material for use with the inventive method comprises a transporting device with at least one cutting blade of a cutter and is inventively characterized in that below the cutter at least one heat source is arranged such that it can be moved into the vicinity of the carcass ply material and extends at least over a portion of the width of the carcass ply material. At both sides of the cutting blade (in the longitudinal direction of the blade) a defined, identical longitudinal zone of the carcass ply material is heated. Advantageously, a single heat source is arranged such that it extends over the entire ply width of the carcass ply material.

The method can thus be integrated into an automated manufacturing process. It is then ensured that cutting of the material strip takes place at the location at which it is heated.

Advantageously, the heat source is an infrared heater. Between the heater and the carcass ply material a slotted sheet metal member is arranged whereby the length (in the circumferential direction of the tire building drum) of the slot is at least the same size as the width of the carcass ply material and its width corresponds to the length of the area to be heated. An infrared heater has the advantage that its radiation is reflected at smooth, light-colored surfaces. The infrared radiation is thus reflected at the sheet metal member arranged between the heater and the carcass ply material, but impinges in the area of the slot onto the carcass ply material. Since the reflected infrared radiation can not heat the sheet metal member, the sheet metal member remains cold while the carcass ply material in the area of the slot is heated.

The sheet metal member thus serves as a template for the heating locations so that an exactly defined longitudinal area can be heat-treated.

In order to cool the heated carcass ply material, a cooling device is provided at least over a portion of the width thereof. The cooling device has parallel, spaced-apart air vents directed onto the carcass ply material and operated with cool air. This cooling device is preferably activated before the material is cut to length. When the heat source extends over the entire width of the carcass ply material, it is advantageous to have a cooling device that extends over the same width.

BRIEF DESCRIPTION OF THE DRAWINGS

The object and advantages of the present invention will appear more clearly from the following specification in conjunction with the accompanying drawings, in which:

FIGS. 2a–2f show in a schematic plan view the inventive device in different operational positions;

FIGS. 3a–3e show a schematic representation of the heating process of the carcass ply material.

DESCRIPTION OF PREFERRED EMBODIMENTS

Figure 1A:
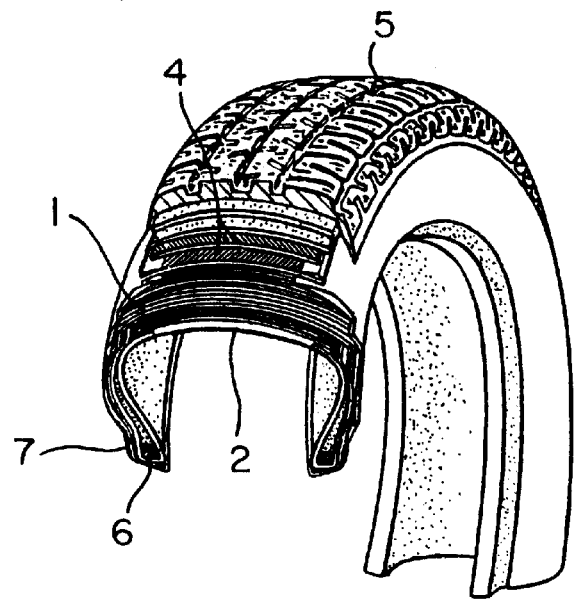
FIG. 1a and FIG. 1b show the basic construction of a vehicle tire.
Figure 1B:
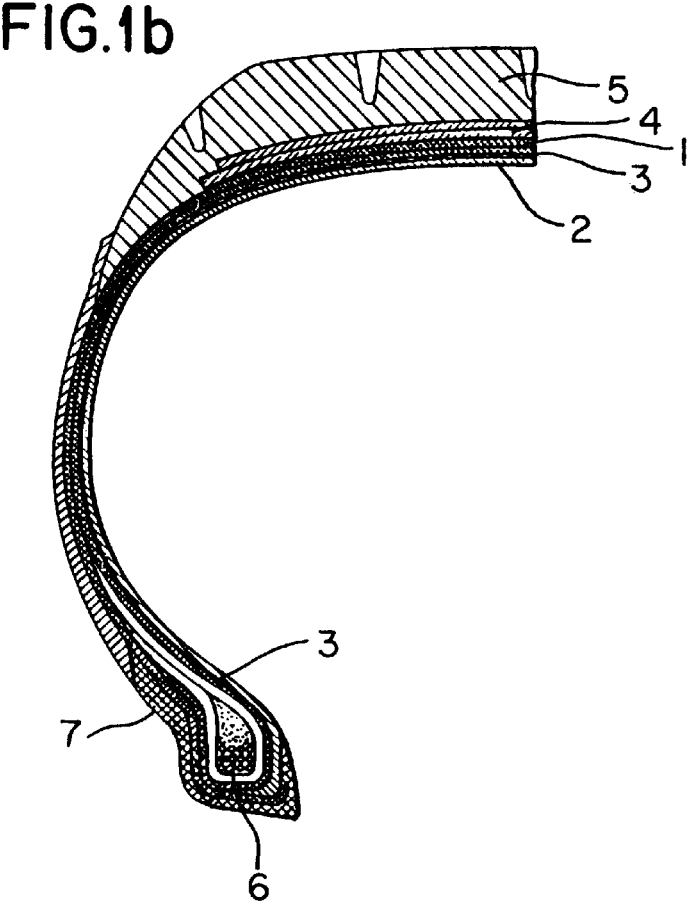

The present invention will now be described in detail with the aid of several specific embodiments utilizing FIGS. 1–3c.

The multi-ply tire is comprised of a carcass including an air-impermeable liner 2 and the carcass ply 3 applied to the liner. The tire further includes the tire bead 6, the lateral strip 7, sidewalls the belt 4, and the tire tread 5.

Before vulcanization, the green tire is produced by winding, respectively, applying the individual plies onto a non-represented tire building drum. In a first step, the liner 2 which is comprised of an air-impermeable rubber layer, is applied. The individual plies are supplied in the form of a strip of a length which corresponds substantially to the circumferencial length of the drum. The building drum is rotated until the trailing end of the strip that forms the liner meets the leading end whereby within the seam area a slight overlap is produced. Subsequently, the carcass ply 3 is applied onto the liner 2. The carcass ply 3 is also a rubber strip comprising a plurality (approximately 1000) polyester cords 8 introduced into the rubber by calendering. The cords 8 extend in the transverse direction of the carcass ply material. These polyester cords are stretched before calendering under exposure to heat.

With a new turn of the building drum, the carcass ply is completely placed onto the drum whereby the leading and trailing ends overlap to form a seam of approximately 1 to 6 mm overlap. The drum is now rotated in the direction of a heat source that extends preferably over the entire drum width until the overlap area is positioned at the heating device. The non-represented heat source is switched on and the overlap area is heated for a short period of time so that the stretched cords 8 in the heated area will contract due to the heat application. The cords 8 within the overlap area (seam) are thus shortened relative to the remaining polyester cords of the carcass ply and thus have a higher stretch capability. Subsequently, the bead cores 6 are laterally positioned. Bead core application rings are then advanced laterally to fold the two lateral edges of the liner 2 and the carcass ply 3 about the cores 6. Subsequently, the lateral strips 7 and optionally a further reinforcement ply are applied and folded over from the exterior in order to envelope the bead cores 6. The carcass 1 is completed and, the drum is reduced in its diameter so that the carcass 1 can be removed.

Advantageously, the heating of the seam area is performed not as disclosed above on the drum, but in a preceding step, as will be explained in the following.

Before the carcass ply 3 is applied to the drum, it is heated at its two narrow sides by a heating bar 14 for approximately 6 to 8 seconds to a temperature of approximately 170° C. over a length that corresponds to the future overlap. For this purpose, the cut-to-length carcass ply 3 is guided across the heating bar 14. The heated area will shrink because the stretched cords 8 will contract due to the heat application. When the carcass ply 3 at its leading and trailing end has been heated over an area of four cords 8, eight cords 8 are provided at the seam location which, relative to the other polyester cords in the carcass ply, are shorter and have a greater stretching capability.

FIGS. 2 and 3 show the course of action of heating of the carcass ply material in combination with an automated supply device 12, also called HM server, that is comprised of a plurality of conveyor belts positioned in different planes and operating in different directions so that the individual plies can be supplied to the building drum in the desired position. In front of the building drum above the supply device 12, a cutter 13 is arranged which comprises a cutting blade comprised of non-represented hook-shaped blades. These hook-shaped blades are applied onto the positioned material such that they impact exactly on the center of the carcass ply strip to be cut and are then moved outwardly in the cutting direction for separating the carcass ply from the endless strip material. It is known in this context to clamp the strip in order to avoid any stretching during cutting and in order to avoid thus a slanted cut. In FIG. 2a the heating device 20 is shown in its basic position. The carcass ply material 3 is transported into its cutting position. The cutting area of the cutter 13 is indicated with reference numeral 18. Once the carcass ply 3 is in the correct cutting position, the sheet metal member 16 that functions as a template is advanced in a first step. This member 16 has a slot 17 of approximately 6 to 8 mm width. The width of the slot 17 corresponds to the length of the seam overlap area of the carcass ply 3. The length of the slot 17 corresponds at least to the width of the carcass ply 3. The sheet metal member 16 is advanced to such an extent that the slot 17 is positioned directly above the future cutting line that is defined by the cutting area 18. The sheet metal member 16 is then lowered onto the carcass ply material. Subsequently, the infrared heater 14 is advanced and heats through the slot 17 the carcass ply 3. The infrared radiation impinging on the sheet metal member 16 adjacent to the slot 17 is reflected so that the sheet metal member 16 is not heated. The carcass ply 3 is thus heated exactly in the area in which it is exposed by the slot 17. After completion of the heating interval, whose length has been optimized empirically, the infrared heater 14 is returned into its initial position. The preheated area is then cooled to room temperature by the air vents 19 of the cooling device 15. Subsequently, the sheet metal member 16 and the cooling device 15 are also returned, respectively, removed from the cutting area 18 of the cutting blade and the carcass ply 3 is cut to length so that with one cut the rearward end of the portion of the carcass ply material to be used for the current tire building step and the leading end of the subsequently used carcass ply have been heated.

The present invention is, of course, in no way restricted to the specific disclosure of the specifications and drawings, but also encompasses any modifications within the scope of the appended claims.

What I claim is:

1. A method for manufacturing a tire carcass, said method comprising the steps of:

providing a liner consisting of an air-impermeable material;

preparing a carcass ply material by heating and stretching plastic cords and embedding the stretched plastic cords in rubber;

placing a ply of the carcass ply material onto the liner with overlapping leading and trailing ply ends;

heating the overlapping ply ends for returning the stretched plastic cords into an unstretched state to prevent constriction at this location within the sidewall of the inflated tire;

positioning bead cores onto the ply;

folding lateral edges of the ply over the bead cores;

enveloping the folded lateral edges and the bead cores by lateral strips.

2. A method according to claim 1, wherein in said step of heating the entire width of the ply is heated.

3. A method according to claim 1, wherein in said step of heating the overlapping ply ends are heated in an area of two to six plastic cords positioned respectively directly adjacent to the leading edge and the trailing edge of the overlapping ply ends.

4. A method according to claim 1, wherein in said step of heating the overlapping ply ends are heated in an area of four plastic cords positioned respectively directly adjacent to the leading edge and the trailing edge of the overlapping ply ends.

5. A method according to claim 1, wherein the step of heating includes selecting a heating period.

6. A method for manufacturing a tire carcass, said method comprising the steps of:

provising a liner consisting of an air-impermeable material;

preparing a carcass ply material by heating and stretching plastic cords and embedding the stretched plastic cords in rubber;

heating a leading and a trailing ply end of a ply of the carcass ply material for returning the stretched plastic cords into an unstretched state to prevent constriction at an overlap area of the leading and trailing ply ends within the sidewall of the inflated tire;

placing the ply onto the liner with the leading and trailing ply ends overlapping;

positioning bead cores onto the ply;

folding lateral edges of the ply over the bead cores;

enveloping the folded lateral edges and the bead cores by lateral strips.

7. A method according to claim 6, wherein in said step of heating the entire width of the ply is heated.

8. A method according to claim 6, wherein in said step of heating the ply ends are heated in an area of two to six plastic cords positioned respectively directly adjacent to a leading edge and a trailing edge of the ply ends.

9. A method according to claim 6, wherein in said step of heating the ply ends are heated in an area of four plastic cords positioned respectively directly adjacent to a leading edge and a trailing edge of the ply ends.

10. A method according to claim 6, wherein the step of placing includes supplying the carcass ply material as a ply material of indefinite length, heating the ply material at a cutting location where a cut is to be performed for cutting the ply material to length, whereby on both sides of the cutting location the same number of plastic cords is heated.

11. A method according to claim 10, wherein after heating the endless ply material is cooled.

12. A method according to claim 11, wherein the endless ply material is cut to length after the step of cooling.

13. A method according to claim 6, wherein the step of heating includes selecting a heating period.

* * * * *

UNITED STATES PATENT AND TRADEMARK OFFICE
CERTIFICATE OF CORRECTION

PATENT NO. : 5,944,926
DATED : 8/31/99
INVENTOR(S) : Hesse

It is certified that error appears in the above-identified patent and that said Letters Patent is hereby corrected as shown below:

Column 4, line 61, after "material" insert --, with Fig. 3e showing a detail of Fig. 3c--

Column 5, line 58, change "Figures 2 and 3" to --Figures 2a-2f and 3a-3e--

Column 6, line 6, change "Figure 2a" to --Figures 2a and 2d--

Signed and Sealed this

Twenty-ninth Day of February, 2000

Attest:

Attesting Officer

Q. TODD DICKINSON

Commissioner of Patents and Trademarks